US006017015A

United States Patent [19]

Heusser

[11] Patent Number: 6,017,015

[45] Date of Patent: Jan. 25, 2000

[54] MAGNETICALLY OPERATED DRAIN VALVE OF AN ELECTROHYDRAULIC LIFTING MODULE

[75] Inventor: Martin Heusser, Munich, Germany

[73] Assignee: Heilmeier & Weinlein Fabrik fur Oel-Hydraulik GmbH & Co. KG, Munich, Germany

[21] Appl. No.: 08/948,203

[22] Filed: Oct. 9, 1997

[51] Int. Cl.[7] .......... F16K 31/12

[52] U.S. Cl. .......... 251/38; 251/30.04; 251/44

[58] Field of Search .......... 251/38, 30.02, 251/30.03, 30.04, 44

[56] References Cited

U.S. PATENT DOCUMENTS

| | | | |
|---|---|---|---|
| 3,977,649 | 8/1976 | Zeuner et al. . | |
| 5,048,790 | 9/1991 | Wells | 251/30.04 X |
| 5,205,531 | 4/1993 | Kolchinsky . | |
| 5,564,673 | 10/1996 | Pieren | 251/30.03 |

FOREIGN PATENT DOCUMENTS

| | | |
|---|---|---|
| 1110895 | 2/1956 | France . |
| 42 39 321 | 5/1994 | Germany . |
| 2 041 169 | 9/1980 | United Kingdom . |

OTHER PUBLICATIONS

Heilmeier & Weinlein Data Sheet No. D 7490/1 (no translation).

*Primary Examiner*—Kevin Lee
*Attorney, Agent, or Firm*—Dorn, McEachran, Jambor & Keating

[57] ABSTRACT

In a magnetically operated drain valve of an electrohydraulic lifting module comprising a closing element which in the closing direction is assigned to a main valve seat, a pilot valve which is actuable by the magnet and arranged in a control chamber of the closing element, a throttle arranged upstream of the control chamber, and a closing member of the pilot valve which is adjustable by the magnet against a spring, the closing member being actuable by the magnet against the spring acting either in the closing adjustment direction or in the opening adjustment direction, a spring with a steep characteristic curve is used as the spring, and the closing element and the main valve seat form a lift-dependent flow-quantity adjusting device.

8 Claims, 4 Drawing Sheets

MAGNETICALLY OPERATED DRAIN VALVE OF AN ELECTROHYDRAULIC LIFTING MODULE

BACKGROUND OF THE INVENTION

The present invention relates to a magnetically operated drain valve of an electrohydraulic lifting module, in particular for stacker trucks, comprising a closing element which in a closing direction is assigned to a main valve seat and which in the opening direction is actuatable by the drain pressure and in the closing direction by a variable difference between the drain pressure and a control pressure derived from the load pressure.

In small, inexpensive stacker trucks, a concept of the lifting module is known in practice, according to which the drain control of the pressurized fluid is performed by a black/white drain valve, as is known from the data sheet D 7490/1 of the company Heilmeier & Weinlein, 81673 M ünchen, which was printed in March 1996. Two different connecting modes of the drain valve are possible. In the first instance the drain valve shuts off fluid in the currentless state of the magnet. The lifting movement is controlled via the pump. The lowering movement is controlled by means of the drain valve which is moved into the passage position by the magnet which has current applied thereto. The pilot valve is fully opened for the lowering function, so that in the relieved state of the control chamber the load pressure lifts the closing element in opening direction over the whole opening stroke via a differential surface on the closing element. In the second mode the drain valve is held in the passage position in the currentless state of the magnet. Supplementary, a two-position switching valve is provided between the consumer and the branch towards the drain valve. The lifting and lowering movements are controlled by means of two valves. During the lifting operation the drain valve is moved into the closing position by the application of current to the magnet, with the two-position switching valve being in the load holding position, and the lifting speed is controlled by the pump. The drain valve is set to the closing position and the two-position switching valve to the drain position for lowering purposes before the drain valve is switched to the passage position. Independently of the connection mode, no ramp function can be controlled with the black/white drain valve during lowering, the ramp function being desired for the stacker truck. The spring which in the first mode is provided as a dosing spring and in the second mode as an opening spring for the pilot valve is soft in both cases, i.e., it has a spring characteristic without any considerable rising gradient. Furthermore, the areas of the nozzle and the passage in the pilot valve are as large as possible in order to obtain a rapid response of the drain valve and are, for instance, designed with respect to the minimun drain amount. The closing element cooperates exclusively with a seat function with the main valve seat to ensure absolute tightness in the closing position of the drain valve. Such tightness is required to make sure that the load pressure is maintained even over a long time.

In more complicated lifting modules for large-sized and expensive stacker trucks, a connection principle according to DE-C2-42 39 321 is known in which the drain control is performed via a two-way flow controller which is given a "truck-tight" operating behaviour (extremely small leakage in closed position, only allowing e.g. a motion of a load for 1 cm/hour). Although there is a ramp function during lowering movements, the constructional efforts required therefor are considerable, so that this lifting module is not used in small and inexpensive stacker trucks for reasons of costs.

SUMMARY OF THE INVENTION

It is the object of the present invention to provide a drain valve of the above-mentioned type which per se permits a ramp function for controlling the lowering movements in a constructionally simple and inexpensive manner. The attempt is here made to substantially maintain the well-established and simple constructional principle of the former black/white drain valves despite the ramp function. Furthermore, a clear-cut ramp function should be obtained with the drain valve which permits a lowering operation and which can also be used for larger and more complicated stacker trucks which so far have been equipped with, for instance, a complicate lifting module according to DE-C2-42 39 321.

The above object is achieved in accordance with the teachings of the invention

Surprisingly enough, a clear-cut ramp function for controlling the lowering movement is obtained by replacing the formerly used soft spring by a hard spring and by integrating the flow-quantity adjusting device. The concept of the black/white drain valve can be maintained by just making a few modifications, i.e., the components of the former black/white drain valve can largely be used. The magnet is capable of adjusting, in response to the current applied to it, exactly predeterminable and exactly reproducible opening positions of the pilot valve to which the closing element adapts in an automatically regulating manner with movements of play. The black/white function is replaced by a control function of the drain valve, the flow-quantity adjusting device regulating the quantity of the pressurized fluid to be drained, which is important for the ramp function. The ramp function is given during the opening and closing of the drain valve. The manufacturing efforts are small, so that the drain valve is particularly suited for small and inexpensive stacker trucks which are subject to an enormous pressure on their prices. The necessary "truck tightness" or even an absolute tightness for holding the load pressure is gained. The magnet which has so far been used for the black/white drain valve concept can easily be modified such that its force characteristic is adapted to the characteristic of the hard spring.

According to the teachings of this invention the passage of the pilot valve and the throttle size, respectively, of the upstream throttle are additionally reduced. It is true that gentler response characteristics are thereby obtained. However, such characteristics are of advantage to the desired ramp function. The throttle and the passage may have the same size and should not be greater than 0.6 mm in practice. The throttle, however, is expediently smaller than the passage. In practice, a throttle having a diameter of 0.4 mm is, for instance, arranged upstream of a passage having a size of about 0.5 mm. As a result, start jerks and stop jerks during the lowering operation are largely avoided.

According to the teachings of this invention, the hard spring acts on the closing member in the closing direction of the pilot valve which is adjustable in the opening direction by the movable armature of the magnet.

Alternatively, according to the teachings of this invention, the closing member is biased by the hard spring in the opening direction of the pilot valve. In both instances, exactly predeterminable and reproducible positions of the plunger can be adjusted by means of the magnet, with the closing element adapting itself by way of play movements to the respective position of the plunger.

The embodiment according to the teachings of this invention is constructionally simple and reliable in function. An absolutely tight closing position exists when the conical surface is pressed onto the seat edge. During initial lifting of the conical surface from the seat edge, pressurized fluid will flow off via the pilot valve and the gap between the slide bore section and the slide attachment before a kind of throttling control takes place with an increasing opening lift of the closing element. It is just shortly before the fully open position or in the fully open position that there is a substantially uncontrolled flow of pressurized fluid. The flow control via the stroke of the closing element can be exactly predetermined constructionally in its characteristic.

According to the teachings of this invention the gap is within standard slide fits.

An embodiment which is advantageous from a manufacturing point of view follows from the teachings of this invention.

The embodiment according to the teachings of this invention in which a desirably slight overlap is achieved for hardly noticeable start or stop jerks is more simple under manufacturing aspects.

According to the teachings of this invention the overlap should be as small as possible.

According to claim 10 the ramp function is achieved by using as many components of the black/white drain valve as possible, which has an advantageous effect on the production costs of the drain valve for the ramp function. It is possible to just replace the spring and the closing member in the black/white drain valve and to modify the magnet slightly in order to achieve the ramp function.

A rigid or hard spring as is used according to the invention with a steep characteristic curve is, for instance, a spring characterized by a force of 13 N or more per mm of spring excursion, whereas a soft spring with a flat characteristic curve is, for instance, characterized by a force of 8 N or less per mm of spring excursion.

BRIEF DESCRIPTION OF THE DRAWINGS

Embodiments of the subject matter of the present invention shall now be explained with reference to the drawing, in which.

DESCRIPTION OF THE PREFERRED EMBODIMENTS

Figure 1:
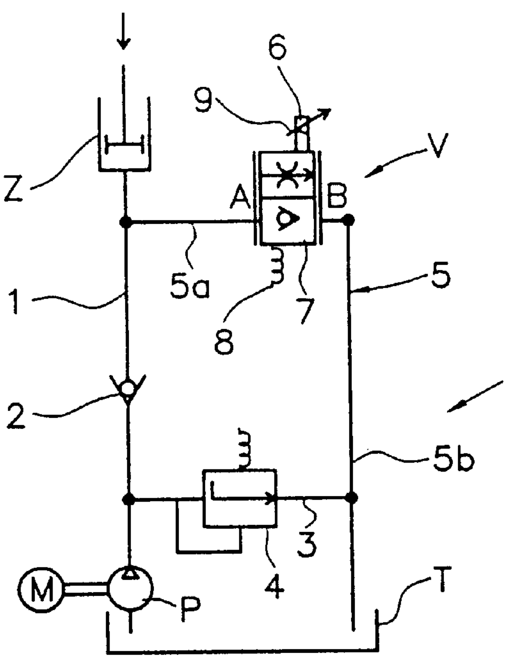
FIG. 1 shows a block diagram of a first embodiment of a lifting module.

A lifting module H as is shown in FIG. 1 for a stacker truck, in which lifting movements of a load are controlled by a cylinder Z with respect to speed and extent by means of a pump P, has a working line 1 which extends from the pump P to cylinder Z, with pump P being driven by a motor M. Pump P sucks fluid from a tank T in which a drain line 5 having two sections **5*a* and 5*b* ends, with the drain line 5 being branched off from the working line 1. A further drain line 3 contains a system-pressure limiting valve 4. A check valve 2 which shuts off fluid towards pump P is arranged in the working line 1 between the drain lines 3 and 5. A magnetically operated drain valve V is provided between the sections 5*a* and 5*b* of the drain line 5, namely, as outlined by the parallel lines, a controlling or regulating drain valve V. In the symbolic representation according to FIG. 1, there is shown a closing element of the drain valve V at 7, the closing element being adjustable by a spring 8 towards the illustrated closing position and by a magnet 6 into a passage position. According to an arrow 9 the magnet 6** can be excited with variable current by which a ramp function is controlled.

In FIG. 1, drain valve V is in the closing position in the curentless state of magnet 6. With the ramp function, it is possible during the lowering operation to sensitively control a gradual increase in speed from a standstill of the load and also a gradual increase in speed until standstill, namely substantially without any noticeable start or stop jerks.

Figure 2:
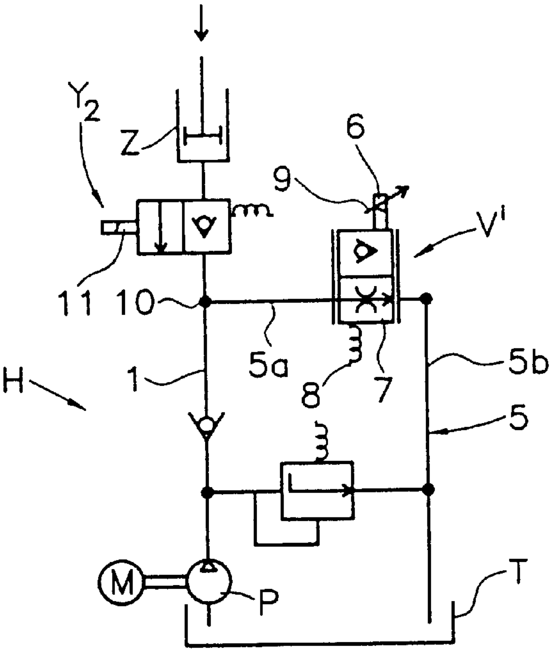
FIG. 2 shows a block diagram of a second embodiment of a lifting module.

In contrast to the embodiment according to FIG. 1, a two-position switching valve V2 is provided according to FIG. 2 between a junction 10 of the drain valve 5 and the cylinder Z, the switching valve V2 being switchable by a switching magnet 11 from the shutoff position into the passage position (black/white valve V2). The magnetically operated shut-off valve V', which is also a control valve, automatically keeps the passage position (shown in FIG. 2) in the currentless state of magnet 6 and, upon actuation of the magnet 6 with a variable current 9 (arrow 9), it is moved into a plurality of positions or in an infinitely variable manner into the closing position under the control of the amount of pressurized fluid to be discharged.

Figure 3:
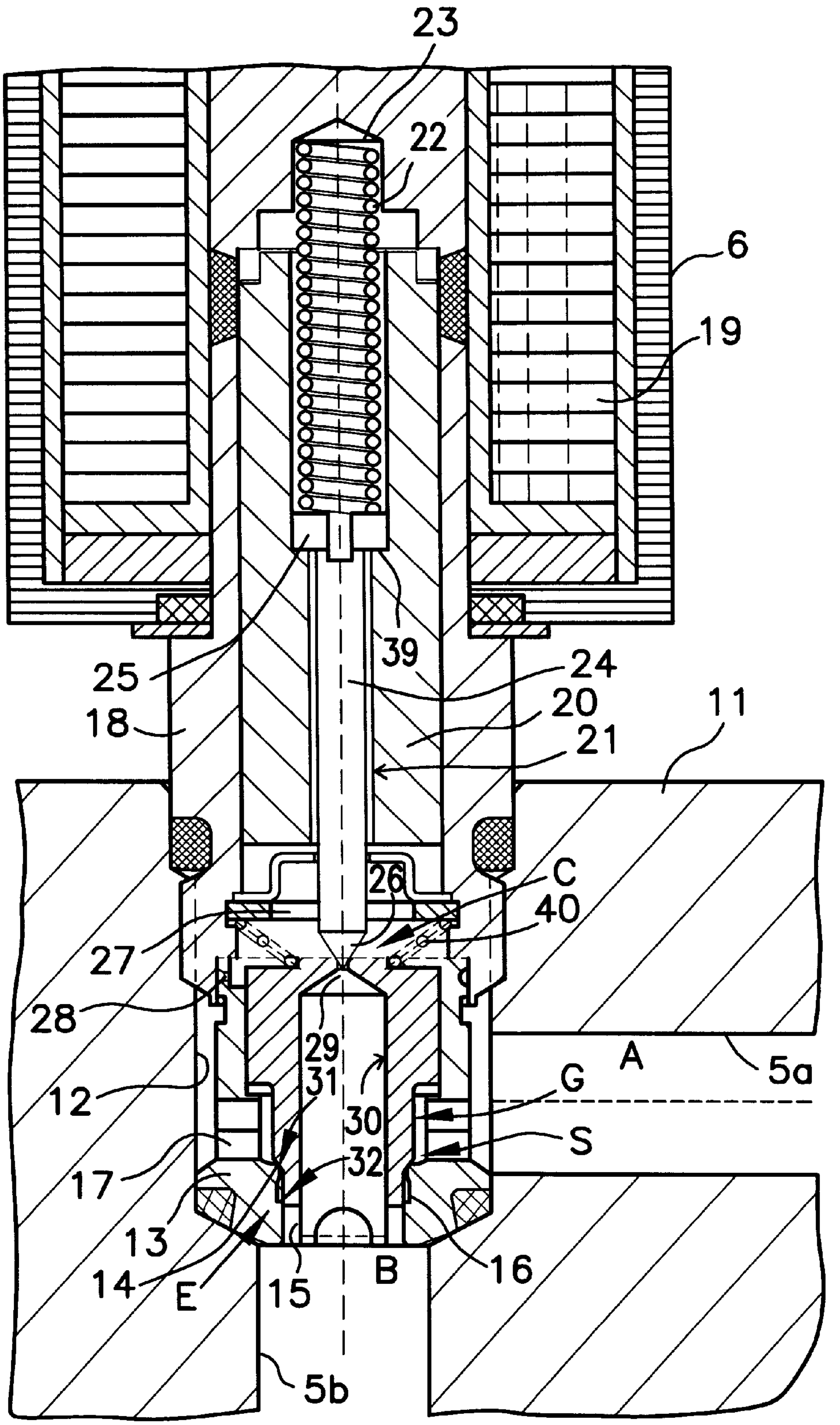
FIG. 3 shows part of an enlarged longitudinal section of a drain valve according to the first embodiment of FIG. 1.

The construction of drain valve V for the connection mode according to FIG. 1 follows from FIG. 3. A housing 11 has provided therein a stepped bore 12 which intersects sections **5*a* and 5*b* of the drain line 5. The load pressure side is designated by A, whereas B represents the drain side towards tank T. A sleeve-like insert 13 which contains a main valve seat S with a sharp (or optionally chamfered) seat edge 14 is positioned in the stepped bore 12 between sections 5*a* and 5*b*. Towards the drain side B, the seat edge is followed by a cylindrical slide bore section 15. A plurality of unthrottled passages 17 lead to the load pressure side A. Insert 13 is fixed in the stepped bore 12 by means of a screw body 18 which carries magnet 6. Magnet 6 contains a coil 19 which can be actuated with variable current for adjusting a movable armature 20 (in FIG. 3 towards the top). The armature 20 includes a bore 21 which is engaged by a hard spring 22 which is held in a stationary core of the magnet 6 (spring abutment 23) and biases a plunger 24 in bore 21** downwards.

The plunger 24 has a head member 25 which has seated thereon spring 22 and which in the closing position of the drain valve V shown in FIG. 3 is seated on a shoulder 39 of the movable armature 20. The lower end of plunger 24 has an approximately conical shape and forms a closing member 26 of a pilot valve C. The pilot valve C monitors the connection between a control chamber 27 at the upper side of a closing element G and the drain side B and has a passage 29 provided in the closing element G, which is designed as a cylindrical throttling port. A weak closing spring 40 for the closing element G is optionally contained in the control chamber 27. Passage 29 is followed by a larger axial bore 30. A throttle 28, for instance in the form of a radial bore, is provided between the load pressure side A and the control chamber 27. The throttle 28 has, for instance, a size of about 0.4 mm, while passage 29 has a size of about 0.5 mm.

The closing element G as a seat valve cooperates with the seat edge 14 of the main valve seat S through a conical surface 31. Furthermore, this area comprises a flow-quantity adjusting device E which consists of the slide bore section 15 in extension of the main valve seat S in insert 13 and of a cylindrical slide protrusion 32 in extension of the conical surface 31 of the closing element G, and will be explained with reference to FIG. 6. Spring 22 is a hard spring, i.e., it has a characteristic (FIG. 7, 36*b*) with a sharp decline of the spring force F across the deformation path s. In the known black/white drain valve according to the prior art, the spring provided at that location is a soft spring with a characteristic 37*b* having a flat curve (outlined in dash-dotted fashion). The force characteristic of the magnet 6 is adapted to the spring characteristic 36*b* of the hard spring 22 in FIG. 3 to be able to adjust exactly reproducible different positions of plunger 24.

Function regarding FIGS. 1 and 3:

In the currentless state of magnet 6 the hard spring 22 keeps the pilot valve C dosed. In control chamber 27 the load pressure of the load pressure side A prevails on an area of the closing element G which is greater than the area of the main valve seat S. The load pressure keeps the closing element G in the illustrated closing position where absolute tightness prevails, as is also the case in pilot valve C. When magnet 6 is acted upon with a predetermined current for introducing a lowering movement, plunger 24 is moved upwards into an intermediate position in which the closing member 26 exits from passage 29. The pressure prevailing in control chamber 27 is reduced, so that the load pressure lifts the closing member G from the main valve seat S. The slide attachment 32 first cooperates with the slide bore section 15 to allow a small amount of pressurized fluid to flow off at the beginning—in addition to the amount of pressurized fluid which flows off via the opened pilot valve C. The closing element G performs a movement of play, resulting in a state of equilibrium in which, in response to possible load pressure variations, the pilot valve C is just throttled to such a degree that a specific opening position or movement of play of the closing element G is obtained, in which position a predetermined amount of pressurized fluid flows off to tank T. When the plunger 24 is positioned even further to the top by intensifying the current for magnet 6, the closing element G will follow accordingly until the overlap between the slide section 32 and the slide bore section 15 is finally eliminated, and pressurized fluid flows off to a greater degree. When the current for the magnet is further increased, the closing element G can finally be moved into the full passage position. When the current is reduced again, the closing element G will again perform a throttling operation. When the current is switched off, the rigid or hard spring 22 will first close the pilot valve C before the load pressure subsequently moves the closing element G into the closing position, with plunger 24 following this closing movement. A ramp function with an only gradually increasing or only gradually decreasing flow quantity towards the tank can thereby be controlled.

Figure 4:
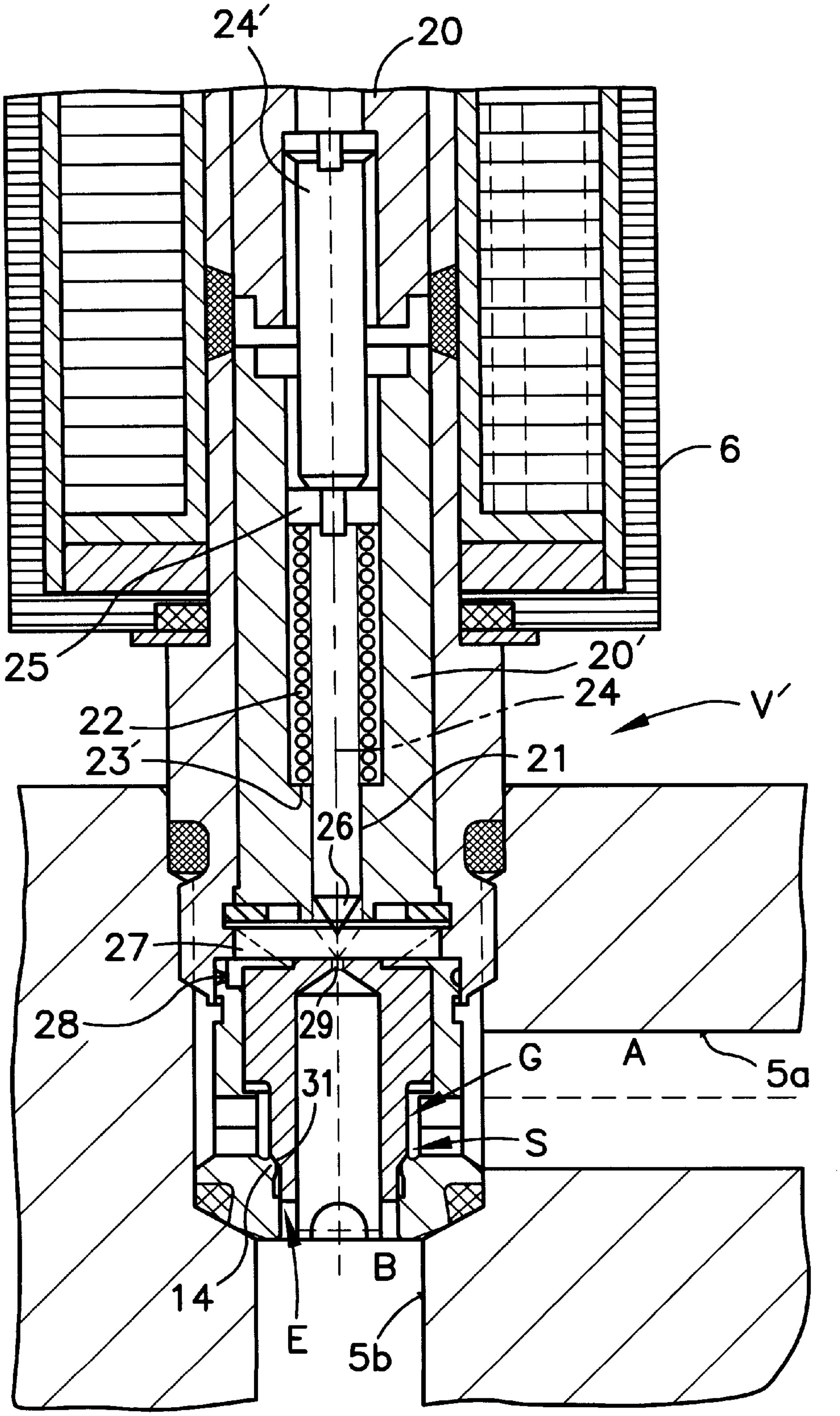
FIG. 4 shows part of an enlarged longitudinal section of a drain valve of the embodiment according to FIG. 2.

In FIG. 4 the armature 20 of magnet 6 presses plunger 24 downwards upon excitation of magnet 6. The hard spring 22 is supported on a stationary abutment 23' in a stationary armature member 20' and acts on the head member 25 of the plunger 24 upwards with a bias in order to open the pilot valve C. This means that in the currentless state of magnet 6 the load pressure in section 5*a* lifts the closing element G into the full passage position from the main valve seat S (FIG. 4 does not show the full passage position of the closing element G). The magnet 6 is modified in comparison with FIG. 3 so that, when current is applied to magnet 6, it will move plunger 24 downwards towards the closing direction of the pilot valve C, i.e., optionally by means of an auxiliary plunger 24. The further construction of drain valve V' corresponds to the one described in FIG. 3, i.e. also size and characteristic of magnet 6 are about the same.

In both embodiments the magnet 6 and the hard spring 23, respectively, are designed such that in the closing position they are capable of overcoming the force which results from the cross-sectional area of passage 29 and is exerted by the current pressure on plunger 24, without any sudden change or jerk being felt. This closing force follows from the fact that the pressure prevailing in the control chamber 27 is applied to all sides of plunger 24 in magnet 6.

Function regarding FIGS. 2 and 4:

In the currentless state of magnet 6, the closing element G assumes its passage position, as the hard spring 22 has moved plunger 24 into the upper end position. When a preselected current is applied to magnet 6, the plunger 24 will be moved against the force of the hard spring 22 with the closing member 26 into passage 29 of the closing element G. The control pressure in control chamber 27 rises. The closing element G is again moved towards its closing position on the main valve seat S. The amount of pressurized fluid which flows off across the main valve seat S is throttled. The closing element G may perform movements of play to open or close the pilot valve C to a greater or lesser extent. When the current for magnet 6 is increased, plunger 24 is moved even further downwards. Closing element G follows this movement further towards its closing position, with the flow-quantity adjusting device E becoming also operative shortly before the final closing position. With maximum current being applied to magnet 6, the closing element G assumes its final closing position in which the conical surface 31 is sealingly seated on seat edge 14. When the current applied to the magnet is reduced again, the outflowing amount of pressurized fluid will be controlled via the initial opening stroke of the closing element G by cooperation between the slide piston section 32 and the slide bore section 15 (FIG. 3). The lowering movement of the load can be controlled in this manner with a ramp function.

Figure 5:
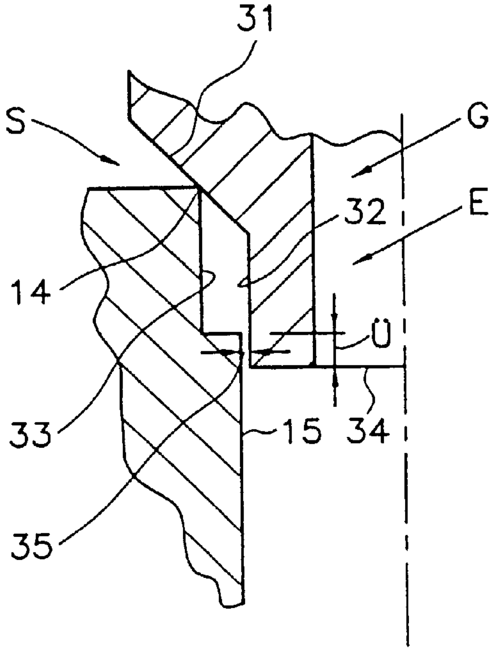
FIGS. 5 and 6 show detail sections with respect to two variants.

According to FIG. 5, the conical surface 31 of the closing element G is directly extended by the slide piston attachment 32. The slide bore section 15 begins at a distance from the seat edge 14 which is predetermined by an enlarged portion 33. An overlap Ü which may expediently be less than 10% of the toal opening stroke of the closing element G exists between the slide piston section 32 and the slide bore section 15 in the closing position (FIG. 5). The overlap Ü is, for instance, defined by the stepped transition between the enlarged portion 33 and the slide bore section 15 and a lower end edge 34 of the slide piston section 32. A gap 35 which is dimensioned in accordance with standard slide fits, e.g. with 0.1 mm, exists in this area. Since the conical surface 31 cooperates with the seat edge 14 in a portion outside the slide piston section 32, the conical surface 31 and the slide piston section 32 can be easily manufactured.

Figure 6:
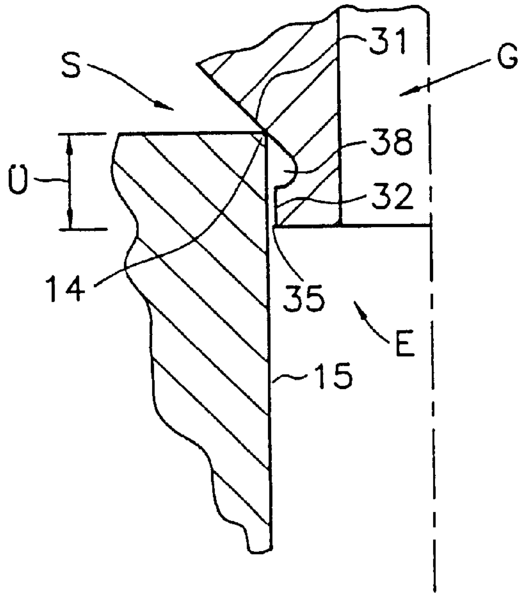

For manufacturing reasons the conical surface 31 of the closing element G shown in FIG. 6 passes via a groove-like restricted portion 38 into the slide piston section 32 which cooperates with the slide bore section 15 that forms a direct axial extension of the seat edge 14. The overlap Ü may be slightly greater. Gap 35 has the predetermined dimensions.

Figure 7:
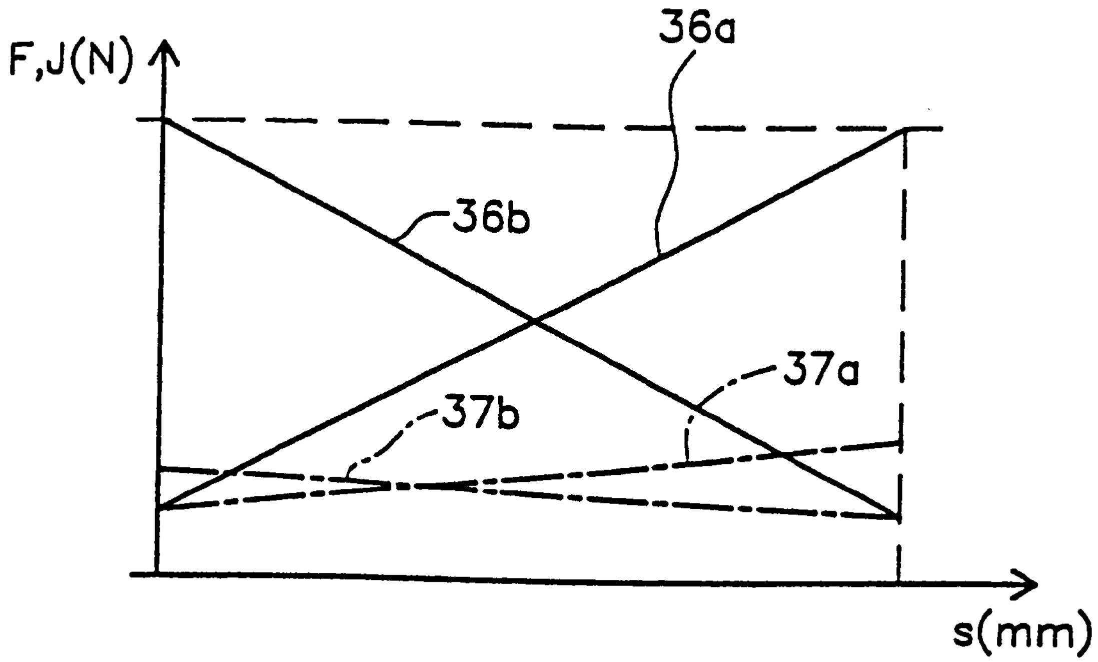
FIG. 7 is a diagram showing spring characteristics.

FIG. 7 shows the characteristic 36*a* for the hard spring 22 of the embodiment of FIG. 4, as compared with the spring characteristic 37*a* of a soft spring which is normally used in such a type of black/white drain valve.

The same type of magnet 6 can virtually be used in both cases; the necessary modifications are simple. A magnet 6 which, being of the same constructional size, is slightly stronger than the convential one used for the known black/white drain valve is advantageously used in the drain valve V, V' to be suited for the hard spring in the drain valve V, V' for the ramp function. The reason for a soft spring in the known black/white drain valve is, by the way, that in the case of a connecting mode in which the drain valve is closed in the currentless state of the magnet the spring is to ensure only a resetting of the masses whereas in the case of a connecting mode in which the drain valve is open in the currentless state of the magnet, said spring is only to define the pressure at which the drain valve is opened without being a disturbing factor through the closing stroke. By contrast, in the drain valve V, V' with the ramp function, the hard spring has the additional function to adjust various positions of the plunger in a reproducible manner either in a stepwise or infinitely variable manner in coooperation with the magnet 6.

I claim:

1. A magnetically operated drain valve of an electrohydraulic lifting module, in particular for stacker trucks, comprising a closing element, which in a closing direction, seats on a main valve seat (S) located between a load pressure on a load pressure side (A) and a drain pressure on a drain pressure side (B), and which in an opening direction is actuatable by said drain pressure and in said closing direction by a variable difference between said drain pressure and a control pressure derived from said load pressure, said closing element being reciprocally movable against said main valve seat into a closing position and away from said main valve seat to open said main drain valve seat, comprising a pilot valve (C) which is operable by means of said magnet (6) and is arranged in a control chamber (27) of a closing element (G) for controlling the magnitude of said control pressure, comprising a throttle (28) located between said control chamber and said load pressure side (A), and a closing member (26) of said pilot valve which is adjustable by said magnet against a spring (22), said closing member being actuable by said magnet against said spring acting either in the closing adjustment direction or in the opening adjustment direction, characterized in that said spring is a spring (22) having a steep characteristic curve (36*a*,36*b*) in order to achieve a ramp function for said drain valve, and that said closing element (G) and said main valve seat (S) form a lift-dependent flow-quantity adjusting device (E) composed of a conical surface (31), a cylindrical slide protrusion (32) plunging into said main valve seat (S) and a seat edge (14), a cylindrical slide bore section (15) which extends from said seat edge (14) towards the side of said pressure drain and which cooperates with said slide protrusion (32) with a gap (35), at least over an initial lifting portion from said closing position of said closing element (G).

2. The drain valve according to claim 1, characterized in that the cross sectional area of said throttle (28) is no larger than the cross sectional area of said passage (29) of said pilot valve (C).

3. The drain valve according to claim 1, characterized in that said spring (22) biases a plunger (24) with an approximately conical tip in the closing direction of said pilot valve (C), that said passage (2) of said pilot valve (C) is an axial bore in said closing element (E), and that said magnet (6) contains a movable armature (20) which can be made to act on said plunger (24) in the opening direction of said pilot valve (C).

4. The drain valve according to claim 1, characterized in that said hard spring (22) biases a plunger (24) having an essentially conical tip in the opening direction of said pilot valve (C), that said passage (29) is an axial bore in said closing element (E), and that said movable armature (20) of said magnet (6) acts on said plunger (24,24') in the closing direction of said pilot valve (C).

5. The drain valve according to claim 1, characterized in that said gap (35) has a size of a standard slide fit.

6. The drain valve according to claim 1, characterized in that said slide bore section (15) is a direct extension of said seat edge (14) and that a surrounding restricted portion (38) is provided between said conical surface (31) and said slide protrusion (32) on said closing element (G).

7. The drain valve according to claim 1, characterized in that said slide bore section (15) starts in axially spaced relationship from said seat edge (14) and has a smaller inner diameter than said seat edge (14), and that said conical surface (31) extends directly up to said slide attachment (32) whose outer diameter is smaller than the inner diameter of said seat edge (14) and said slide bore section (15).

8. The drain valve according to claim 1, characterized in that an axial overlap (Ü) which is less than 10% of the total opening stroke of said closing element (G) is provided between said slide section (32) and said slide bore section (15) in the closing position of said element (G).

* * * * *